United States Patent
Haas et al.

(10) Patent No.: US 9,036,865 B2
(45) Date of Patent: May 19, 2015

(54) LOCATION DETERMINATION FOR AN OBJECT USING VISUAL DATA

(75) Inventors: Norman Haas, Mount Kisco, NY (US); Ying Li, Mohegan Lake, NY (US); Charles A. Otto, Lansing, NY (US); Sharathchandra Pankanti, Darien, CT (US); Yuichi Fujiji, Houston, TX (US); Hoang Trinh, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 13/612,345

(22) Filed: Sep. 12, 2012

(65) Prior Publication Data
US 2014/0072169 A1 Mar. 13, 2014

(51) Int. Cl.
 *G06K 9/62* (2006.01)
 *G06T 7/00* (2006.01)

(52) U.S. Cl.
 CPC ..... *G06T 7/0044* (2013.01); *G06T 2207/10016* (2013.01); *G06T 2207/30108* (2013.01); *G06T 2207/30252* (2013.01)

(58) Field of Classification Search
 None
 See application file for complete search history.

(56) References Cited

U.S. PATENT DOCUMENTS

| | | | | |
|---|---|---|---|---|
| 4,758,959 | A * | 7/1988 | Thoone et al. | 701/472 |
| 5,721,685 | A | 2/1998 | Holland et al. | |
| 6,219,615 | B1 * | 4/2001 | Chambers | 701/480 |
| 8,213,682 | B2 * | 7/2012 | Nakamura et al. | 382/104 |
| 2001/0055063 | A1 * | 12/2001 | Nagai et al. | 348/116 |
| 2004/0122569 | A1 | 6/2004 | Bidaud | |
| 2008/0262717 | A1 * | 10/2008 | Ettinger | 701/206 |
| 2009/0055093 | A1 * | 2/2009 | Hamilton et al. | 701/209 |
| 2010/0007551 | A1 | 1/2010 | Pagliuco et al. | |
| 2010/0076631 | A1 | 3/2010 | Mian | |
| 2010/0082238 | A1 * | 4/2010 | Nakamura et al. | 701/208 |
| 2010/0235404 | A1 * | 9/2010 | Morris | 707/803 |
| 2010/0290699 | A1 * | 11/2010 | Adam et al. | 382/155 |
| 2011/0243383 | A1 * | 10/2011 | Oyaizu | 382/103 |
| 2011/0285842 | A1 * | 11/2011 | Davenport et al. | 348/116 |
| 2012/0189162 | A1 * | 7/2012 | Sawada | 382/103 |
| 2012/0209429 | A1 * | 8/2012 | Yamaguchi et al. | 700/259 |
| 2013/0035915 | A1 | 2/2013 | Painsky | |
| 2013/0138685 | A1 * | 5/2013 | Brucher et al. | 707/769 |
| 2013/0259387 | A1 * | 10/2013 | Gunn et al. | 382/218 |

OTHER PUBLICATIONS

Ying Li, Charles Otto, Norm Haas, Yuichi Fujiki, and Sharath Pankanti. 2011. Component-based track inspection using machine-vision technology. In Proceedings of the 1st ACM International Conference on Multimedia Retrieval (ICMR '11), Apr. 17-20, Trento, Italy.*

Ying, et al. "Component-based track inspection using machine-vision technology." Proceedings of the 1st ACM International Conference on Multimedia Retrieval. ICMR'11, Apr. 17-20, 2011, Trento, Italy.*

Non Final Office Action dated Feb. 25, 2014 received for U.S. Appl. No. 14/060,334.

Final Office Action dated Sep. 24, 2014 received for U.S. Appl. No. 14/060,334.

* cited by examiner

*Primary Examiner* — Daniel Mariam
*Assistant Examiner* — Thomas A James
(74) *Attorney, Agent, or Firm* — Fleit Gibbons Gutman Bongini & Bianco PL; Thomas Grzesik

(57) ABSTRACT

A global position of an observed object is determined by obtaining a first global position of an observed object with at least one positioning device. A determination is made as to whether a set of stored visual characteristic information of at least one landmark matches a visual characteristic information set obtained from at least one captured image comprising a scene associated with the observed object. In response to the set of stored visual characteristic information matching the obtained visual characteristic information set, a second global position of the observed object is determined based on a set of stored location information associated with the at least one landmark and the first global position.

20 Claims, 11 Drawing Sheets

| LANDMARK ID 302 314 | LANDMARK TYPE 304 316 | VEHICLE LOCATION 306 318 | LANDMARK LOCATION 308 320 | IMAGE(S)/ FRAME(S) 310 322 | ATTRIBUTES 312 326 | NUMBER OF TIES 313 |
|---|---|---|---|---|---|---|
| LANDMARK_1 | TYPE_1 | LOCATION_A | LOCATION_B | I/F_A1 I/F_B1 | WHITE, TILTED | 50  328 |
| LANDMARK_2 | TYPE_2 | LOCATION_C | LOCATION_D | I/F_A2  324 | ... | ... |
| LANDMARK_3 | TYPE_3 | LOCATION_E | LOCATION_F | I/F_A3 I/F_B3 | RED 4, WINDOWS | 7000 |
| ... | ... | ... | ... | ... | ... | ... |
| LANDMARK_N | TYPE_N | LOCATION_Y | LOCATION_Z | I/F_A100 I/F_B100 | ... | 10 |

| TRACK COMPONENT ID ↓402 | COMPONENT TYPE ↓404 | DAMAGE/ DEFECT TYPE ↓406 | TRACK COMPONENT LOCATION ↓408 | DISTANCE TRAVELLED ↓410 | NUMBER OF TIES ↓412 |
|---|---|---|---|---|---|
| COMPONENT_1 | TYPE_A 416 | D1 418 | LOCATION_A 420 | DISTANCE_A 422 | 100 424 |
| COMPONENT_2 | TYPE_B | D2 | LOCATION_B | DISTANCE_B | 1000 |
| COMPONENT_3 | TYPE_C | D1 | LOCATION_C | DISTANCE_C | 20 |
| ... | ... | ... | ... | ... | ... |
| COMPONENT_N | TYPE_N | DN | LOCATION_N | DISTANCE_N | 5000 |

LOCATION DETERMINATION FOR AN OBJECT USING VISUAL DATA

FIELD OF THE INVENTION

The present invention generally relates to location determination, and more particularly relates to location determination for objects using visual data.

BACKGROUND OF THE INVENTION

Determining object location for detected objects has a variety of uses and applications such as asset management, road inspection, railroad track inspection, etc. For example, according to recent safety statistics published by the Federal Railroad Administration (FRA), the total damage caused by all reported derailment accidents in the US amounts to hundreds of millions of dollars annually, more than 10% of which is due to track problems. For safety and efficiency reasons, railroad track inspection for physical defects and irregularities is required to be performed on a regular basis in order to maintain a high standard of track condition. Railroad track inspection generally includes a wide variety of specific tasks, ranging from locating and evaluating the condition of different rail components (tie plates, anchors, joint bars, etc.) to monitoring rail surfaces, alignments and curvatures, to detecting multi-tie spiking and anchoring non-compliance.

SUMMARY OF THE INVENTION

In one embodiment, a method for determining a global position of an observed object is disclosed. The method comprises obtaining a first global position of an observed object with at least one positioning device. A determination is made as to whether a set of stored visual characteristic information of at least one landmark matches a visual characteristic information set obtained from at least one captured image comprising a scene associated with the observed object. In response to the set of stored visual characteristic information matching the obtained visual characteristic information set, a second global position of the observed object is determined based on a set of stored location information associated with the at least one landmark and the first global position.

In another embodiment, a method for maintaining a database of target objects for inspection is disclosed. The method comprises analyzing at least one image comprising a scene. The image is captured by at least one image capturing device situated on a vehicle. A first set of visual characteristic information associated with the scene is identified based on the analyzing. The first set of visual characteristic information is compared with a second set of visual characteristic information associated with at least one target object. The first set of visual characteristic information and the second set of visual characteristic information are determined to match each other within a given threshold, based on the comparing. A set of positioning information associated with the railroad inspection vehicle is obtained. The second set of visual characteristic information is stored with the set of positioning information in a record of a database associated with the at least one target object.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 shows one example of environmental information corresponding to visual environmental features/objects according to one example of the present invention;

FIG. 4 shows one example of inspection information that can be captured/recorded by the location determining system of FIG. 2 according to one example of the present invention;

DETAILED DESCRIPTION

Detailed embodiments of the present invention are disclosed herein. It is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Operating Environment

Figure 1:
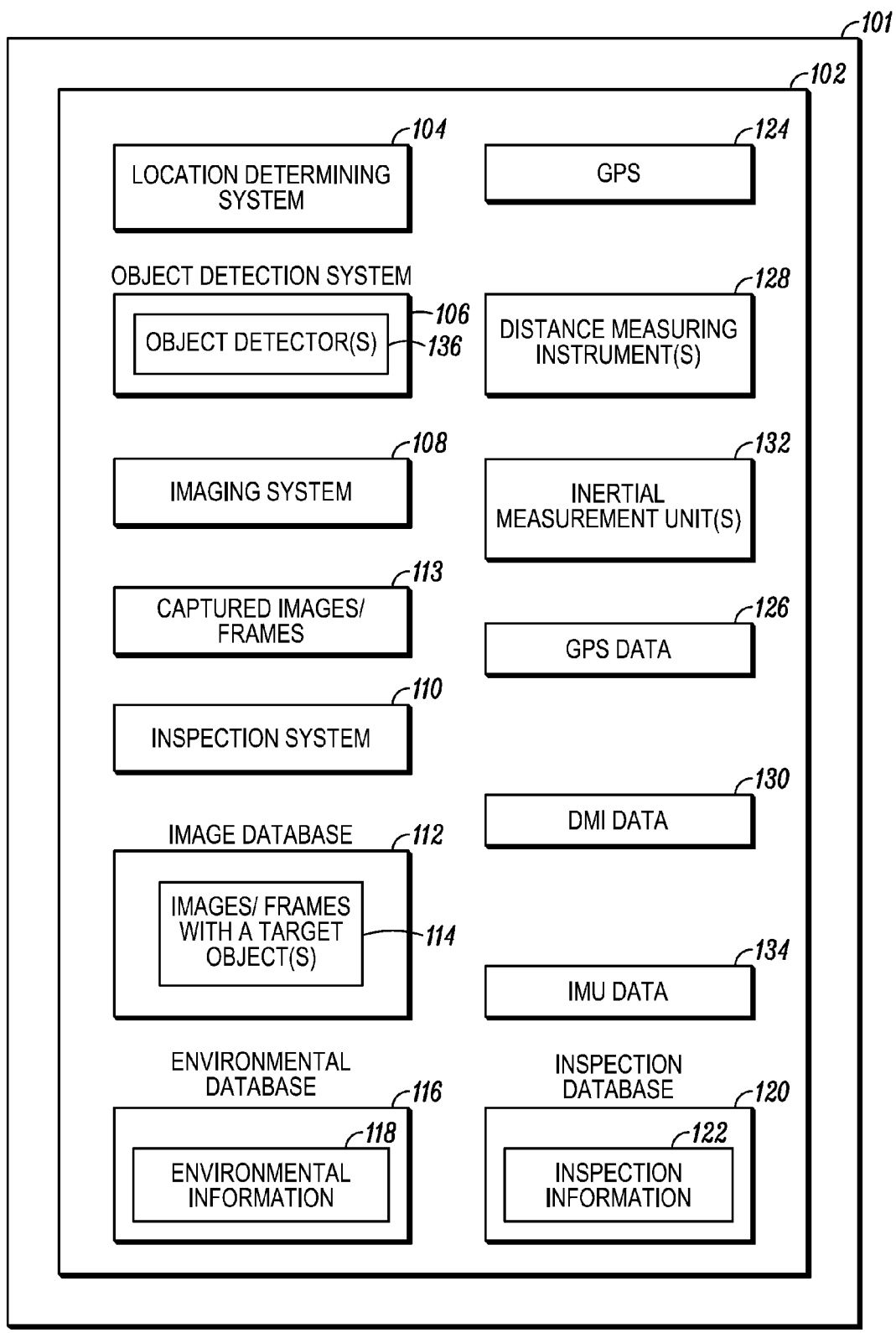
FIG. 1 is a block diagram illustrating a high level overview of a system for determining a location of an object according to one embodiment of the present invention.

FIG. 1 illustrates a general overview of one operating environment 100 according to one embodiment of the present invention. In particular, FIG. 1 shows an information processing system 102 that can be implemented within a moveable/transportable entity 101 such as a vehicle (e.g., an automobile, motorcycle, train, and the like), briefcase, backpack, etc. It should be noted that a vehicle is used throughout this discussion as one non-limiting example of the moveable/ transportable entity 101. Additionally, the system 102 can be communicatively coupled to a user-assisted training environment for training purposes. The system 102 can either be a physical system comprising each of the components discussed below or can be a functional entity composed of each of the components discussed below. It should be noted that even though the following discussion is directed to railroad track inspection, embodiments of the present invention are not limited to such an application. For example, one or more embodiments can be utilized in other applications such as, but not limited to, road inspection, asset inspection, other tasks whose essential characteristic is not inspection at all, such as precision hole-drilling or precision paint-marking, or any other environment where accurate location information is desired. Railroad track inspection and railroad track component detection are used as only one non-limiting example applicable to embodiments of the present invention.

The system 102, in one embodiment, comprises a location determining system (LDS) 104, an object detection system (ODS) 106 comprising object detectors 136, an imaging system 108, an inspection system 110, an image database 112 comprising one or more images/frames 114 (and/or extracted regions of image frames), an environmental database 116 comprising environmental information 118, and an inspection database 120 comprising inspection information 122. The imaging system 108 comprises one or more image capturing devices 1002, 1004 (FIG. 10) such as (but not limited to) a camera that is communicatively coupled to the information processing system 102 for delivering image frames 113 thereto. Selected instances 114 of these imaging frames 113 are then stored within the image database 112. At least one of the image capturing devices 1002 faces outward and/or from the vehicle 101 such that ground-based objects 1006 being inspected by the inspection system 110 are in the field(s)-of-view 1008 of the imaging device(s) 1002. In another embodiment, at least one of the image capturing devices 1004 faces outward from the vehicle 101 such that ground based objects 1010 (e.g., landmarks) are in the field(s)-of-view 1012 of the imaging device(s) 1004.

The system 102 also comprises various sensory devices such as one or more global positioning systems (GPS) 124 that generate GPS data 126, one or more distance measuring instruments (DMIs) 128 that generate distance data 130, and one or more inertial measuring units (IMUs) 132 that generate inertial measurement data 134. GPS data 126 can include, but is not limited to, longitude data, latitude data, elevation data, speed data, direction travelled data, acceleration data, etc. Distance data 130 can include, but is not limited to, distance travelled, calculated velocity and acceleration data, etc. IMU data 134 can include, but is not limited to, acceleration data, direction of travel data, etc. It should be noted that one or more of the components (including the imaging system 108 and the frames 113 it generates) shown in FIG. 1 can reside outside of the system 102 and be communicatively coupled to the system 102. It should also be noted that two or more of the above components (including the imaging system 108 and the frames 113 it generates) can be combined into a single component as well.

Location Determining System

Figure 2:
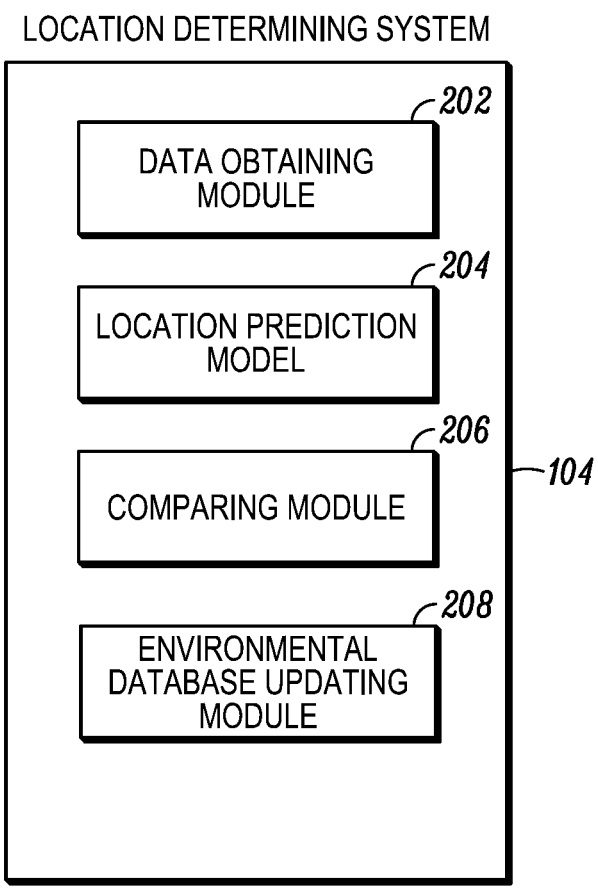
FIG. 2 is a block diagram illustrating a detailed view of a location determining system according to one example of the present invention.

FIG. 2 shows a more detailed view of the LDS 104. In particular, FIG. 2 shows that, in one embodiment, the LDS 104 comprises a data obtaining module 202, a location prediction model 204, a comparing module 206, and an environmental database updating module 208. Each of these components is discussed in greater detail below. Continuing with FIG. 1, the images/frames 113, in one embodiment, represent frames or fragments of frames of a video sequence (or still photo sequence) of an external environment captured/observed by one or more image capturing devices of the imaging system 108, or a subset of such frames and/or frame fragments. In one embodiment, the images/frames (or frame fragments) 113 represent an observed scene or portion thereof.

Figure 10:
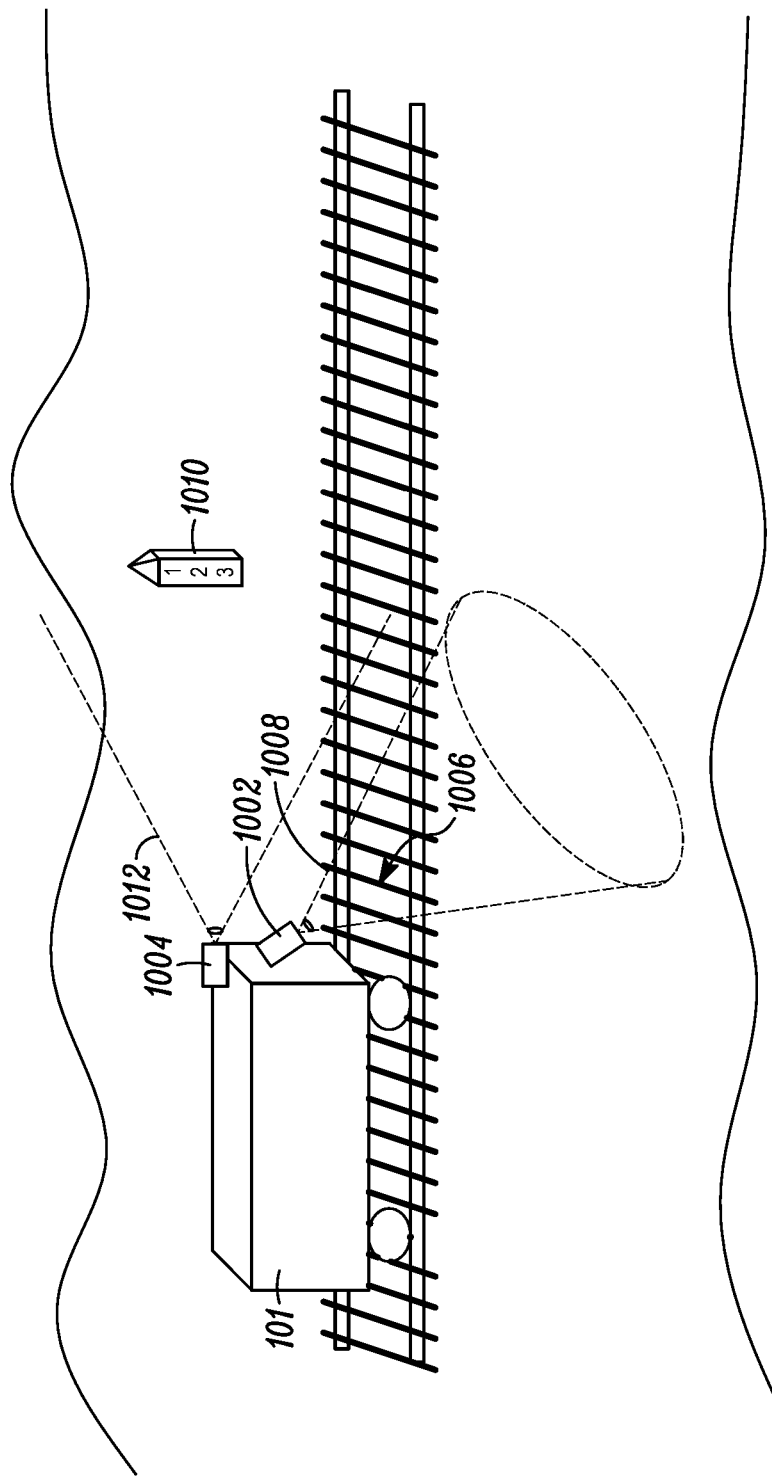
FIG. 10 illustrates one example of an imaging processing system according to one embodiment of the present invention.

These images/frames 113 are analyzed by object detectors 136 within the ODS 106 to detect target objects within the images/frames 113. In one embodiment, a first set of target objects comprises various visual environmental features/objects such as landmarks/monuments 1010 (FIG. 10). A landmark/monument can be (but is not limited to) inventory assets, buildings, components of a building (e.g., doors, windows, architectural features, etc.), mile markers (mileposts), signs, railroad signals, street signs, intersections, trees, damaged and/or missing railroad track components, and the like. A second set of target objects (also referred to herein as "inspection system target objects") comprises objects that are of interest to the inspection system 110. For example, the second set of target objects can be components of a railroad track, such as, but not limited to, railroad ties, railroad spikes, rail anchors, the rails themselves, etc. The ODS 106 detects these inspection system target objects and the inspection system 110 analyzes the images/frames comprising these target objects to detect any defects/damage associated therewith. For example, defects or damaged areas such as, but not limited to, broken ties, areas with missing ties, areas with missing spikes, areas with missing anchors, etc. are identified by the inspection system 110.

In one embodiment, the inspection system 110 identifies defects/damage associate with an identified target object using a process similar to that uses by the ODS 106 for detecting target objects. In another embodiment, the ODS 106 can also identify defects/damage associated with the target objects. It should be noted that in one embodiment, the inspection system 110 can be part of object detection system 106 or vice versa. Also, defects and damaged areas can be considered a third set of target objects. However, the target objects of one or more embodiments are not limited to railroad components and defects.

The object detector(s) 136, in one embodiment, is a feature-based detector(s), a machine learning-based detector(s), or the like. The object detector 136 receives input (e.g., images/frames 113) from the imaging system 108 and performs one or more analysis operations thereon. Based on these operations, the object detectors 136 can determine whether or not the frames/images 113 (or portions/fragments thereof) comprise a target object. Frames/images (or portions/fragments thereof) that comprise a target object are stored in the image database 112 and are identified as "Images/Frames With A Target Object(s) 114" in FIG. 1. For example, in one embodiment, the object detector 136 compares a captured image/frame 113 to a set of reference images (not shown) to identify a target object within an image/frame 113. Alternatively, or in addition, the object detector 136 can utilize previously captured image/frames 114 in which a target object has been identified for determining whether or not a current image/frame 113 comprises a target object. The object detector 136 can also be pre-trained with respect to target objects of interest using one or more training models (not shown). Based on this training, the object detector 136 is able to detect target objects within the images/frames 113. A more detailed discussion on object detection can be found in the commonly owned and co-pending U.S. application Ser. No. 13/085,985 entitled "Object Recognition Using HAAR Features and Histograms of Oriented Gradients"; the commonly owned and co-pending U.S. application Ser. No. 13/086,023 entitled "Detection of Objects in Digital Images";

and the commonly owned and co-pending U.S. application Ser. No. 13/277,936 entitled "Optimizing The Detection Of Objects In Images", which are hereby incorporated by reference in their entireties. A more detailed discussion on image analysis for railroad track inspection can be found in the commonly owned publication entitled "Component-Based Track Inspection Using Machine-Vision Technology", Li et al., ICMR'11, April 2011, which is hereby incorporated by reference in its entirety.

In addition to detecting target objects, the ODS 106 further analyzes a detected target object within an image/frame and identifies various visual/appearance attributes and characteristics associated therewith. For example, the ODS 106 can identify the color/shape, orientation, number of doors/windows, and any other visual/appearance attributes and characteristics of a landmark that can be used to identify a given landmark. This visual/appearance attribute and characteristic information is stored with a target object, as discussed in greater detail below.

When the object detection system 106 has detected a landmark target object, the LDS 104, in one embodiment, associates location information with that target object. One example of associating location information with a landmark target object is as follows. The LDS 104 determines the current location of the vehicle 101 or system 102. The LDS 104 records this location information, along with either the image/frame (or frame fragment) 114 comprising the landmark target object and/or other identifying information such as visual attributes/characteristics of the target object, as a record of inspection information 122 in the inspection database 120. For example, the data obtaining module 202 of the LDS 104 retrieves/receives the GPS data 126 from the GPS device 124 that is associated with the position of the vehicle at substantially the same time that images/frames 114 comprising the target object were captured.

The data obtaining module 202 can also retrieve/receive data from the other sensory devices such as the DMI 128, and IMU 132. Additional processing can then be performed on this data to determine the location as a GPS coordinate, a GPS coordinate plus distance travelled (in, for example, feet or meters), and/or the like. The ODS 106 can be used to count the number of railroad ties that have been detected from a reference location such as a previously detected landmark, a given longitude/latitude, etc. This tie count can be utilized by the LDS 104 as part of the location determining process. It should be noted that, in some embodiments, GPS data can be obtained for a landmark directly at the landmark's location. The information obtained by the LDS 104 from the various sensory devices 124, 128, 132 and the ODS 106 is stored in the environmental database 116 as environmental information 118 and as a component of the inspection information 122. The LDS 104 or another component in the system 102 can also process the image/frame(s) 114 comprising the target object to determine the location of the target object itself. This location information is associated with the target object and stored as environmental information 118 as well.

As will be discussed in greater detail below, the location information associated with a landmark is utilized by the LDS 104 to refine and improve the accuracy of an initial position measurement of an observed object (e.g., a railroad component that has a defect) than can be obtained. For example, the location information associated with a landmark can be merged with the GPS data 126 (or other location data) of an observed object. This allows the system to obtain a corrected position of the observed object. Also, allowance can made for the fact that the position of the observed and recognized object is different from the position of the camera performing the observing.

When a defect (or damage) has been detected on/in an identified railroad track component, the inspection system 110 records the identified track, the type of defect or damage identified, the location of the identified track component (as identified by the LDS 104), etc. The information recorded by the inspection system 110 can then be stored within the inspection database 120 as inspection information 122.

FIG. 3 shows one example of environmental information 118 stored within the environmental database 116 after a landmark has been detected by the ODS 106. As discussed above, this environmental information 118 corresponds to landmarks/monuments detected within images/frames 114 captured by the imaging system 108. Each detected landmark/monument can be associated with a unique identifier, the location/position of the vehicle 101 (or system 102) at the time the image/frame 114 comprising the landmark was captured, the location/position of the landmark itself (if known), the image(s)/frame(s) comprising the landmark, attributes/characteristics of the landmark, etc.

Environmental Information

For example, FIG. 3 shows a table 300 comprising a plurality of columns and rows representing environmental information 118 within the environmental database 116. In one embodiment, each row corresponds to a single detection of a landmark. The table 300 includes a first column 302 entitled "Landmark ID", a second column 304 entitled "Landmark Type", a third column 306 entitled "Vehicle Location", a fourth column 308 entitled "Landmark Location", a fifth column 310 entitled "Image(s)/Frame(s)", a sixth column 312 entitled "Attributes", and a seventh column 313 entitled "Number of Ties". It should be noted that one or more additional columns can be added to the table 300 and/or one or more of the above columns can be removed from the table 300. Database technology, such as taking joins in relational databases, can be used to reduce the inefficiency of redundant information in the multiple detections, by employing an additional table to store only the information that varies in the multiple detections.

The Landmark ID column 302 comprises entries 314 that uniquely identify each landmark that has been detected. The Landmark Type column 304 comprises entries 316 that identify the type of landmark that was detected. As discussed above, a landmark can be, but is not limited to, buildings, components of a building (e.g., doors, windows, architectural features, etc.), mile markers, signs, railroad signals, street signs, intersections, trees, and the like. Therefore, entries 316 under the Landmark Type column 304 indicate, for example, which of these landmark types is associated with a detected landmark.

The Vehicle Location column 306 comprises entries 318 indicating the location/position of the vehicle 101 at the time the associated landmark was detected. This position/location information can be longitude and latitude information obtained from the GPS data 126 or any other type of position/location information. In one embodiment, the LDS 104 derives the position/location information using two or more of the GPS data 124, DMI data 130, and/or the IMU data 134. In one embodiment, a separate column (not shown) can be included in the table 300 for distance travelled data or the "Number of Ties" column can be used for expressing the distance travelled from a given coordinate, a previous landmark, etc.

The Landmark Location column 308 comprises entries 320 that indicate a position/location of the detected landmark, if known, corresponding to that row of the table 300. This position/location information can be longitude and latitude information and/or distance travelled information. The LDS 104 and/or the ODS 106 can analyze one or more of the images/frames 114 comprising the landmark to determine the position/location of the landmark. For example, the LDS 104 can triangulate the position/location of the landmark from images/frames captured by multiple cameras of the imaging system 108 and/or multiple views from the same camera, taking into account data obtained from the sensory devices 124, 128, 132, as the camera vehicle moves down the track or road. The position/location of the landmark can also be measured directly at the landmarks by mechanisms other than system 102 as compared to being calculated from images/frames 114. In one embodiment, a single position/location of a landmark can be stored or multiple positions can be stored. For example, if a landmark is a building, the position/location of various features of the building such as the corners, windows, doors, can be calculated and stored in the table 300.

The Image(s)/Frame(s) column 310 comprises entries 322 that identify the image(s)/frame(s) in which the associated landmark was detected. For example, a first entry 322 identifies image/frames "I/F_A1" and "I/F_B1" as comprising landmark "Landmark_1". The identifiers "I/F_A1" and "I/F_B1" indicate that image/frame 1 captured by camera A and image/frame 1 captured by camera B include Landmark_1. Cameras can have overlapping fields of view. It should be noted that if a multi-camera system is being used, each camera many not always capture an image with a landmark. For example, a second entry 324 under the Image(s)/Frame(s) column 310 shows that only camera A captured an image with Landmark_2 therein. The notation "I/F_A1", etc, can be generalized to "I/F A1-10", for example, to permit representing a range of frames (1 to 10), as well as a single frame (1), in the case where the same landmark, is detected in a range of consecutive frames, having the same attributes in each frame in the range.

The Attributes column 312 comprises entries that identify various attributes such as visual characteristics of a detected landmark. For example, Landmark_1 can be a mile marker, as indicated by landmark type Type_1. A first entry 326 corresponding to Landmark_1 under the Attributes column 312 indicates that the Landmark_1 is associated with visual characteristics indicating that Landmark_1 is white and tilted. The attributes/characteristics of a detected landmark can be determined by the ODS 106 during the object detection process. It should be noted that the location information stored under the Vehicle Location column 308 can also include multiple locations for a given attribute/characteristic of a landmark. For example, as the vehicle 101 travels along its path (track, road, etc.), the same landmark may be observed from multiple positions, but the position of an attribute/characteristic of the landmark will change. Therefore, the location of the vehicle when the feature is detected as well as the location of the feature within each frame can be stored within the environmental database 116.

The Number of Ties column 313 comprises entries 328 that identify the number of ties that have been counted from a reference point until the image(s)/frame(s) comprising the landmark were captured. For example, a first entry 328 under this column shows that 50 ties were counted from a reference point until images I/F_A1 and I/F_B1 were captured. The reference point can be a previous landmark, a known location, or the like. The Distance Travelled column 317 comprises entries 330 indicating the distance travelled from a given reference point until the location of the identified landmark. The reference point can be a given latitude/longitude position (e.g., a GPS position), a GPS position plus distance travelled, and/or a previously detected landmark, etc. The distance travelled data can be obtained, for example, from the DMI 130 or even calculated from the GPS data 126.

The landmark information shown in FIG. 3 can be obtained during a data gathering process performed prior to and/or during inspection of the railroad track. For example, the vehicle 101 can ride along the railroad track to gather landmark information and populate the environmental database 116 accordingly. Once stored, the environmental information 118 stored in the environmental database 116 can be dynamically updated as the inspection process is being performed.

Location Determining of Observed Objects

The following is a more detailed discussion on determining the location of an observed object using the environmental information and sensory data discussed above. To begin with, the LDS 104 initializes various data structures and/or values for use in the location prediction model while the vehicle 101 is stationary or moving along the track. For example, the values for distance (position) s, velocity v, and acceleration a are initialized to their zero$^{th}$ values. The data obtaining module 202 in the LDS 104 obtains GPS data 126 (e.g., latitude and longitude) from the GPS device(s) 124 for the current position of the vehicle 101. The LDS 104 also obtains information from the DMI 128 and/or the IMU 132.

For example, the LDS 104 obtains the odometry position (i.e., distance travelled) and the velocity of the vehicle 101 from the DMI data 130 generated by the DMI 128. The DMI 128 receives information updates from electronic signals generated by one or more components of the vehicle 101. For example, the vehicle 101 can emit a pulse from the transmission, every time a given component such as a shaft rotates one complete turn, or some fraction of a complete turn. However, other mechanisms for providing information to the DMI 128 are applicable as well. In one embodiment, the DMI 128 includes a register (e.g., a counter) that maintains the current distance travelled. In one embodiment, the register is initialized to zero at the start of the drive, but any starting value is applicable as well. With respect to velocity, the DMI 128 (or the LDS 104) can calculate velocity as either the difference in the distance travelled values in the register from the start of one unit of time to the start of the next unit of time. The velocity can also be derived from some other output of the vehicle 101 or the sensory devices 124, 128, 132. With respect to acceleration, if the vehicle 101 begins from a standing start the acceleration is determined to be zero. Otherwise, the acceleration can be computed from the difference of two velocity readings. Alternatively, the acceleration can be obtained from the IMU 132, which can directly read the acceleration.

After initializing these values at time i=0, the LDS 104 uses the location prediction module 204 to calculate (predict) the i+1$^{th}$ values of a, v, and s to determine a predicted position $s_{i+1}$ at the time interval i+1 (or any other interval). The LDS 104 can also calculate other expected data such as an expected distance travelled at $s_{i+1}$, expected velocity at $s_{i+1}$, expected acceleration at $s_{i+1}$, expected duration of travel to $s_{i+1}$, etc. Once the predicted position $s_{i+1}$ has been calculated, the LDS 104 analyzes the environmental database 116 to determine if any landmarks have been registered (i.e., detected) for this predicted position $s_{i+1}$. For example, if the predicted position $s_{i+1}$ is Location_A, the LDS 104 analyzes the environmental database 116 to determine if a landmark has been registered/stored for Location_A. As can be seen from FIG. 3, Landmark_1 has been registered for Location_A. Therefore, the LDS 104 can expect Landmark_1 to be detected by the ODS 106 when the vehicle arrives at Location_A.

As the vehicle 101 continues to travel, the vehicle 101 reaches an actual position at time i+1. The LDS 104 then obtains the actual values of $v_{i+1}$ and $s_{i+1}$. For example, the data obtaining module 202 of the LDS 104 obtains GPS data 126, DMI data 130, and/or IMU data 134 for this current position. The LDS 104 then determines the actual position of the vehicle 101 at time i+1. The ODS 106 analyzes images/frames 113 captured by the imaging system 108 at this current position to detect any landmarks or lack of landmarks therein. Information regarding the error tolerances of the cameras, the sensors 124, 132, 130, and the analytics used to process their data is also obtained. This information can be stored either in the environmental database 116 and/or another area of the system 104.

The comparing module 206 of the LDS 104 compares the predicted position $s_{i+1}$ with the actual measured position for i+1. The comparing module 206 can also compare other expected sensory information such as expected distance travelled, expected velocity, and expected acceleration, etc. with actual measured information as well. The comparing module 206 also compares the expected visual information (e.g., occurrence of a landmark or non-occurrence of a landmark) with the visual information actually detected by the ODS 106. For example, if the LDS 106 was expecting Landmark_1 to be detected at position $s_{i+1}$, the LDS 104 analyzes the ODS information for the current position to determine if Landmark_1 was detected. This comparison process can also take into account the characteristics/attributes of the landmarks as well. For example, the ODS 106 compares visual attributes/characteristics associated with the landmarks expected to be observed at the current position with visual attributes/characteristics associated with an observed scene in the captured images. If a match exists within a given tolerance the ODS 106 determines that the expected landmark has been observed (or not observed). For example, if the environmental database indicates that Landmark_1 is a mile marker that is white and tilted then the LDS 104 determines if the ODS 106 has detected a mile marker that is white and tilted at the current position.

Various other comparisons can also be performed as well. For example, an expected distance travelled at position $s_{i+1}$ can be compared to an actual distance travelled at time i+1. Additionally, an expected number of railroad ties for $s_{i+1}$ can be compared to an actual number of railroad ties that have been counted. These additional comparisons can also be used in combination with the position/location and visual/environmental information comparison processes to provide a more accurate and robust location. For example, if all comparisons result in a match or a substantial match (e.g., within a given tolerance) then the predicted location and measured location have a high degree of accuracy. However, if one or more of the comparisons do not match then the system is able to adjust the location prediction model 204 accordingly based on the degree of variation between predicted measurements and actual measurements. However, if a majority of the comparisons match then the system can still have a high degree of confidence when assigning location/position information to an object, while being able to adjust the location prediction model 204 to provide more accurate predictions.

If the predicted position $s_{i+1}$ expected visual/environmental information, and optionally the expected sensory information match the actual measured data (or match within a given tolerance) the LDS 104 updates the current position and context of the vehicle 101 and/or object being inspected, such as a railroad tie component. Context, in one embodiment, refers to the terrain around a given geo-location, such as landmarks (and their images) around the vicinity of the location. The LDS 104 can make minor adjustments to the values for a, v, and s in the location prediction model, if needed, based on degree of variation (or deltas) between the expected values and the actual measured values. If sensors are not available for directly measuring acceleration or velocity, any discrepancy in Δs can be back-projected into Δv and Δa. In the presence of accelerometers and/or direct velocity sensing, the degree of variation (or delta) can be factored into the corrections for Δv, Δa, and Δs. The next position is predicted based on the updated current position and the values of a, v, and s are updated in the location prediction model 204. The process is then repeated.

If the predicted position $s_{i+1}$ and the actual measured position match (or match within a given tolerance threshold), but the visual expectation varies from the actual observed environment greater than a given tolerance threshold, the LDS 104 determines that the vehicle 101 is in the expected place but that a landmark was either added, removed, or replaced. If a landmark was added, the environmental database updating module 208 of the LDS 104 adds the landmark to the environmental database 116, similar to that discussed above. For example, an entry is added in the table 300 that identifies the landmark, its type, the system location, landmark location, image/frames comprising the landmark, attributes/characteristics of the landmark, tie count, etc. If a landmark was removed, the updating module 208 can update the environmental database 116 by removing the entry in the table 300 that corresponds to the removed landmark. Alternatively, the updating module 208 can update the corresponding entry to indicate that a landmark does not exist at that given location. If a landmark was changed, the entry corresponding to the old landmark can be updated to identify the new landmark and its relevant information.

If the predicted position $s_{i+1}$ and the actual measured position match (or match within a given tolerance threshold), but the visual expectation varies from the actual observed environment by less than a second tolerance threshold, the LDS 104 determines that the vehicle 101 is in the expected place but that the expected landmark has changed (e.g., has been damaged, remodeled, painted, etc.). In this instance, the updating module 208 can update the table 300 to show these new or changed attributes/characteristics of the landmark.

It should be noted that if a predicted position is not associated with a visual environmental component such as a landmark (i.e., a non-occurrence of a landmark is expected), the LDS 104 can utilize the last known landmark position and sensory data to verify the current position. For example, if predicted position $s_{i+1}$ is not associated with a landmark, the location prediction model 204 can be used to predict how many railroad ties are between the last known landmark and position $s_{i+1}$; the distance to be travelled between the last known landmark and position $s_{i+1}$; the time required to travel between the last known landmark and position $s_{i+1}$; etc. The LDS 104 can determine the corresponding information based on the actual measured position and a comparison process can be performed between the predicted/expected information and the determined corresponding information.

It should be noted that a predicted position is not required. For example, in one embodiment the LDS 104 obtains location/position information from one or more of the sensors 124, 128, 132. The LDS 104 then analyzes the environmental database 116 to identify landmark/monument information for the location information received from the sensors 124, 128, 132. The LDS 104 then compares this expected landmark/monument information with the landmark/monument information currently detected (or not detected) by the ODS 106. If the expected landmark/monument information matches the observed landmark/monument information at least within a given tolerance threshold, then the location information received from the one or more of the sensors 124, 128, 132 is accurate and the current position of the vehicle 101 is updated. If the expected landmark/monument information fails to match the observed landmark/monument information at least within the given tolerance threshold, the system 102 can notify the user.

In one embodiment, the inspection system 110 utilizes the LDS 104 to determine an accurate position/location of a damaged or missing railroad track component (also referred to herein as an "observed object"). For example, the inspection system 110 monitors the ODS 106 to determine when a railroad track component has been detected and if the component has been damaged, as discussed above. When the inspection system 110 determines that a damaged (or missing) component has been detected, the LDS 104 110 obtains an initial global position associated with the observed object. As discussed above, this initial global position comprises longitude and latitude coordinates obtained from the GPS system 124. Current GPS systems that are commercially available to the public have an error rate that is not acceptable for pinpointing the location of an observed object. Therefore, the LDS 104 utilizes information 118 stored within the environmental database 116 to refine and improve the accuracy of the initial global position obtained for the observed object.

Figure 11:
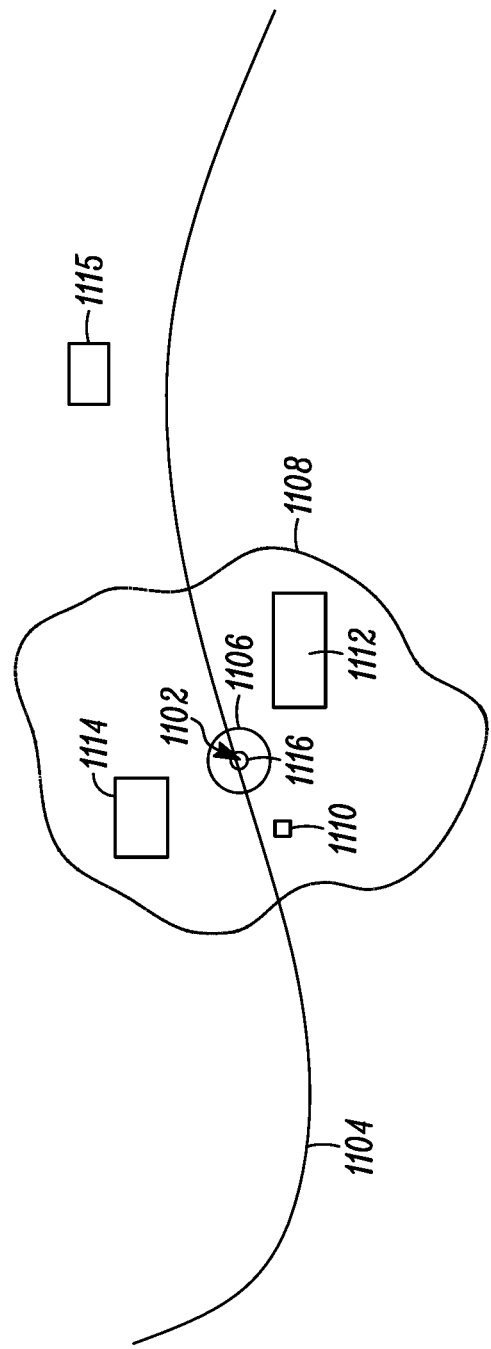
FIG. 11 illustrates one example of a geographical vicinity for providing accurate global positions of observed objects according to one example of the present invention.

For example, based on the initial global position the LDS 104 determines a geographical vicinity associated with the detected component, as shown in FIG. 11. In particular, FIG. 11 shows an object 1102 observed along the path 1104 of the vehicle (not shown in FIG. 11). FIG. 11 also shows an area of uncertainty 1106 associated with the initial global position of the observed object 1102. A geographical vicinity 1108 associated with the observed object 1102 is also shown. A geographical vicinity 1108, in one embodiment, is an area within a given distance from the initial global position. This area can be centered on the initial global position, be offset from the initial global position, begin or stop at the initial global position, etc. The geographical vicinity 1108 can surround the initial global position or be a portion of the area surrounding the initial global position. The field-of-view 1008, 1012 of the image capturing devices 102, 104 can be fixed within the vicinity 1108 and/or variable within the vicinity 1108.

Once the geographical vicinity 1108 associated with the observed object 1102 has been determined, the ODS 106 identifies one or more candidate landmarks 1110, 1112, 1114 that are expected to be observable in the geographical vicinity 1108. Landmark 1115, by virtue of its location relative to the location of observed object 1102 is not expected to be observable, and therefore the vicinity is defined so as not to include landmark 1115. In this embodiment, the ODS 106 analyzes the environmental information 118 within the environmental database 116 to identify a set of landmarks that are associated with location information within the geographical vicinity 1108. This set of landmarks is considered the set of candidate landmarks by the ODS 106.

As images 113 are captured by the imaging system 108, the ODS 106 analyzes each image 113 to determine if one or more of the candidate landmarks 1110, 1112, 1114 have been detected. For example, the ODS 106 compares a set of visual characteristic information associated with each of the set of candidate landmarks 1110, 1112, 1114 to a visual characteristic information set obtained from one or more captured images 113. The set of visual characteristic information associated with a landmark can identify a particular feature(s) of the landmark as well as the location of the feature within each image/frame where the feature was detected. The ODS 106 then determines if the set of set of visual characteristic information associated with at least one candidate landmark matches the visual characteristic information set from the captured image(s) within a given visual appearance threshold. If so, the ODS 106 determines that at least one of the candidate landmarks 1110, 1112, 1114 has been detected. The LDS 104 then obtains the location information associated with the at least one candidate landmark from the environmental database 116.

The LDS 104 utilizes the location information associated the detected landmark(s) and the initial global position to generate a new global position that comprises a higher degree of accuracy than the initial global position. For example, FIG. 11 shows a circle 1116 surrounding the observed object 1102, which represents the degree of accuracy/higher precision of the new global position. As can be seen, the degree of uncertainty/error of the new global position is much smaller than the degree of uncertainty/error 1106 of the initial global position. Therefore, the new global position, in one embodiment, is more accurate than the initial global position. It should be noted that when multiple landmarks are detected within the geographical vicinity 1108, an even greater degree of accuracy can be obtained.

In addition to detecting defects/damage associated with an observed object, the inspection system 110 also records inspection information 122 associated with the observed object within the inspection database 120. For example, the inspection system 110 records the identified track component, the type of defect or damage identified, the location of the identified track component, etc. As discussed above, the location of an identified railroad track component is obtained from the LDS 104 by obtaining a first global position of the railroad track component with at least one positioning device. A determination is made as to whether a set of stored visual characteristic information of at least one landmark matches a visual characteristic information set obtained from at least one captured image comprising a scene associated with the railroad track component. In response to the set of stored visual characteristic information matching the obtained visual characteristic information set, a second more refined global position of the railroad track component is determined based on a set of stored location information associated with the at least one landmark and the first global position.

FIG. 4 shows a table 400 comprising a plurality of columns and rows representing inspection information 122 within the inspection database 120. In one embodiment, each row corresponds to an inspection system target object such as (but not limited to) a railroad track component that is missing, damaged, or has a defect, or a landmark object, which has appearance properties, and may also have damage. The table 400 includes a first column 402 entitled "Track Component ID", a second column 404 entitled "Component Type", a third column 406 entitled "Defect/Damage Type", a fourth column 408 entitled "Track Component Location", a fifth column 410 entitled "Distance Travelled", and a sixth column 412 entitled "Number of Ties". It should be noted that one or more additional columns can be added to the table 400 and/or one or more of the above columns can be removed from the table 400.

The Track Component ID column 402 comprises entries 414 that uniquely identify each track component that has been detected (or determined to be missing). The Component Type column 404 comprises entries 416 that identify the type of railroad track component that was detected such as, but not limited to, a railroad tie, a railroad spike, an anchor, the rail itself, etc. The Defect/Damage Type column 406 comprises entries 418 indicating the type of defect/damage that has been detected for the given railroad track component. As discussed above, a defect or damage can be, but not limited to, a broken railroad tie, a missing railroad tie, a missing railroad spike, a missing anchor, etc. Therefore, entries 418 under the Defect/Damage Type column 406 indicate, for example, which of these types of defects/damage is associated with a detected railroad track component. In another embodiment, the Defect/Damage Type column 406 can also include information associated with the detected appearance of the component. For example, if the color of a component is expected to be black and is detected to be white, this color difference is considered a defect, and recorded. Property value pairs such as (but not limited to) "color=white", "tilt=10 degrees", etc. can be used to record appearance defects.

The Track Component Location column 408 comprises entries 420 indicating the location/position of the identified track component. This position/location is obtained from the location determination process performed by the LDS 104, as discussed above. This information can be longitude and latitude information. The Distance Travelled column 410 comprises entries 422 indicating the distance travelled from a given reference point until the location of the identified track component. The reference point can be a given latitude/longitude position, a previously detected landmark, etc. The Number of Ties column 412 comprises entries 424 that identify the number of ties that have been counted from a reference point until the location comprising the identified track component.

As can be seen from the above discussion, embodiments of the present invention accurately determine a position of an object by utilizing visual information associated with a surrounding environment in combination with sensory data such as GPS data, DMI data, and IMU data. One or more of these embodiments can stand alone and/or be implemented within an inspection system to accurately and robustly determine an inspected object's location.

Operational Flow Diagrams

Figure 5:
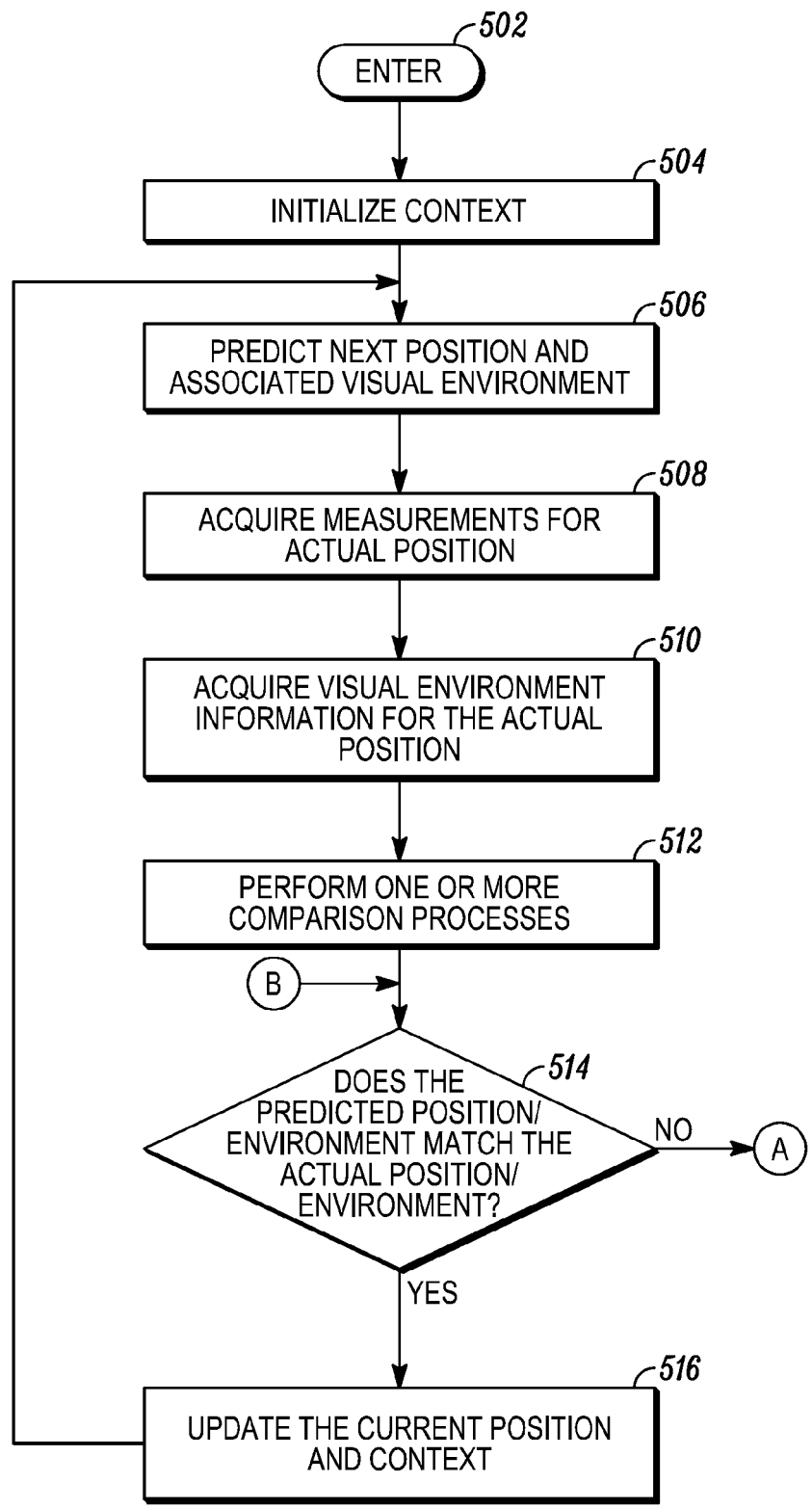
FIGS. 5 and 6 are operational flow diagrams illustrating one process for determining the location of an object utilizing visual environmental features/objects according to one embodiment of the present invention.
Figure 6:
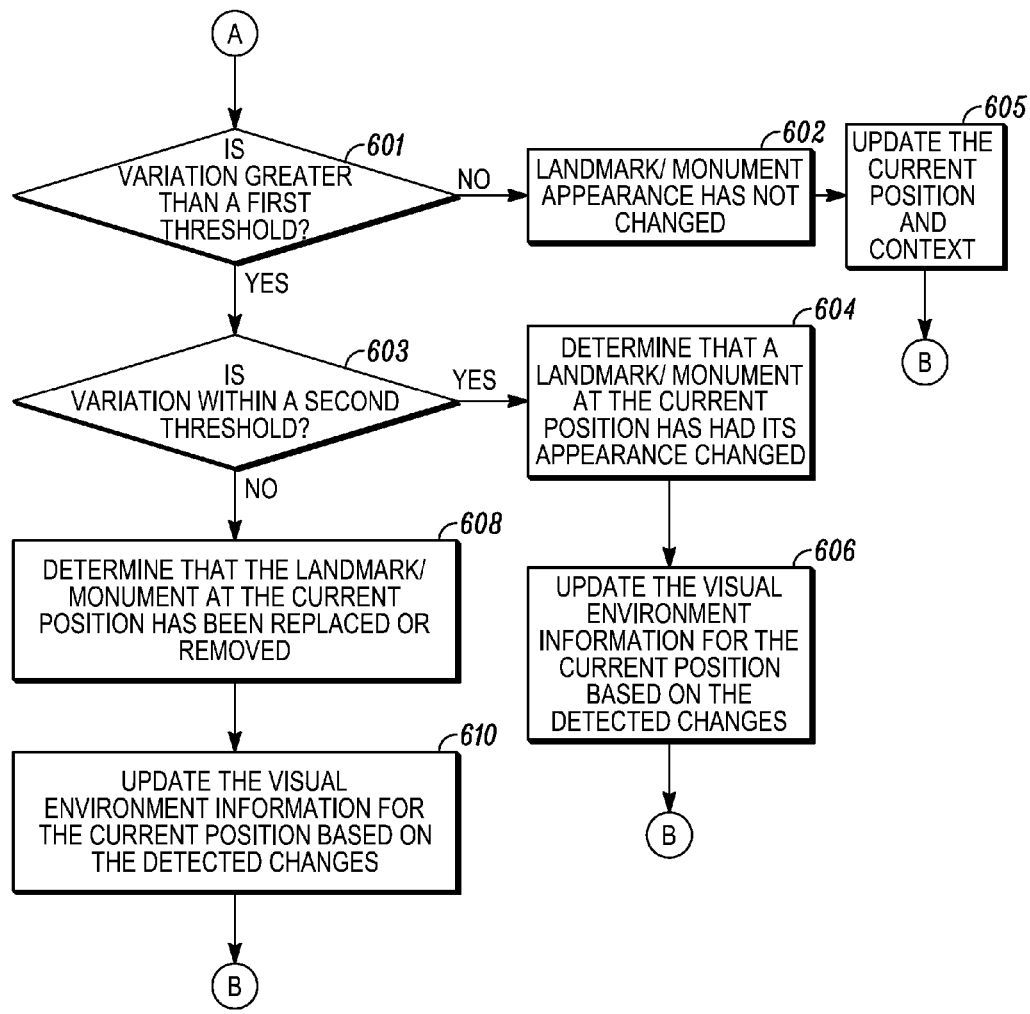

FIGS. 5-6 are operational flow diagrams illustrating one example of the location determining process discussed above. It should also be noted that a predicted position is not required, as discussed above. The operational flow begins at step 502 and flows directly to step 504. The LDS 104, at step 504, initializes the system context such as the values for current position, velocity, acceleration of the vehicle 101, and the location prediction module 204. The LDS 104, at step 506, predicts the next position of the vehicle 101 at a given future time and the associated visual environment features/objects or information (e.g., landmarks and their visual characteristics) that are expected to be observed at the predicted position. When the given time arrives, the LDS 104, at step 508, acquires positional and other sensory data to obtain a measured position/location of the vehicle 101. At substantially the same time as step 508, the LDS 104, at step 510, also acquires visual environment information for the actual position.

The LDS 104, at step 512, compares the predicted position and expected visual environment features/information with the measured position and observed visual environment features/information. The LDS 104, at step 514, determines if the predicted position and expected visual environment features/information matches the measured position and observed visual environment features/information. If the result of this determination is positive, the LDS 104, at step 516, updates the current position of the vehicle (or other object) and also updates the context such as the velocity/acceleration values for vehicle 101 and the location prediction model 204. The control flow returns to step 506 for the next cycle. It should be noted that the process for updating the vehicle location (or other object) takes into consideration the positions of all the landmarks visible at this time, thus developing a more accurate and robust location estimate.

If the result of the determination at step 514 is negative, control flows to entry point A of FIG. 6. The LDS 104, at step 601, determines if the variation between the expected visual environment features/information and the observed visual environment features/information is greater than a first tolerance threshold such as, but not limited to, 0. If the result of this determination is negative, the LDS 104, at step 602 determines that the appearance of the landmark has not changed. Therefore, the variance detected at step 514 is a result of a mis-estimation of the current vehicle position. The current position and context, at step 605 is then updated/reset based on the information 118 in the environmental database 116. Control flows to entry point B of FIG. 5, where the process of step 514 is performed. This time, the test will succeed and control will fall through to step 516 and back to step 506.

If the result of the determination at step 601 is positive, the variance detected at step 514 is a result of changes to visual characteristics of the landmark. Control is passed to step 603, where the LDS 104 determines if the variation between the expected visual environment features/information and the observed visual environment features/information is within a second tolerance threshold. If the result of this determination is positive, the LDS 104, at step 604, determines that the appearance of the expected visual environment feature at the current position has changed. The LDS 104, at step 606, updates the environment information 118 in the environmental database 116 for the current position, based on the detected changes. The control then flows to entry point B in FIG. 5, from whence it will flow to entry point A (step 601) and then to step 602 since the appearance variation will be within the first threshold.

If the variation at step 603 exceeds the given threshold, the LDS 104, at step 608, determines that the expected visual environment feature at the current position has been replaced or removed. The LDS 104, at step 610, updates the environment information 118 in the environmental database 116 for the current position based on the detected changes. The control then flows to entry point B in FIG. 5, from whence it will flow to entry point A (step 601) and then to step 602, since the appearance variation will be within the first threshold.

Figure 7:
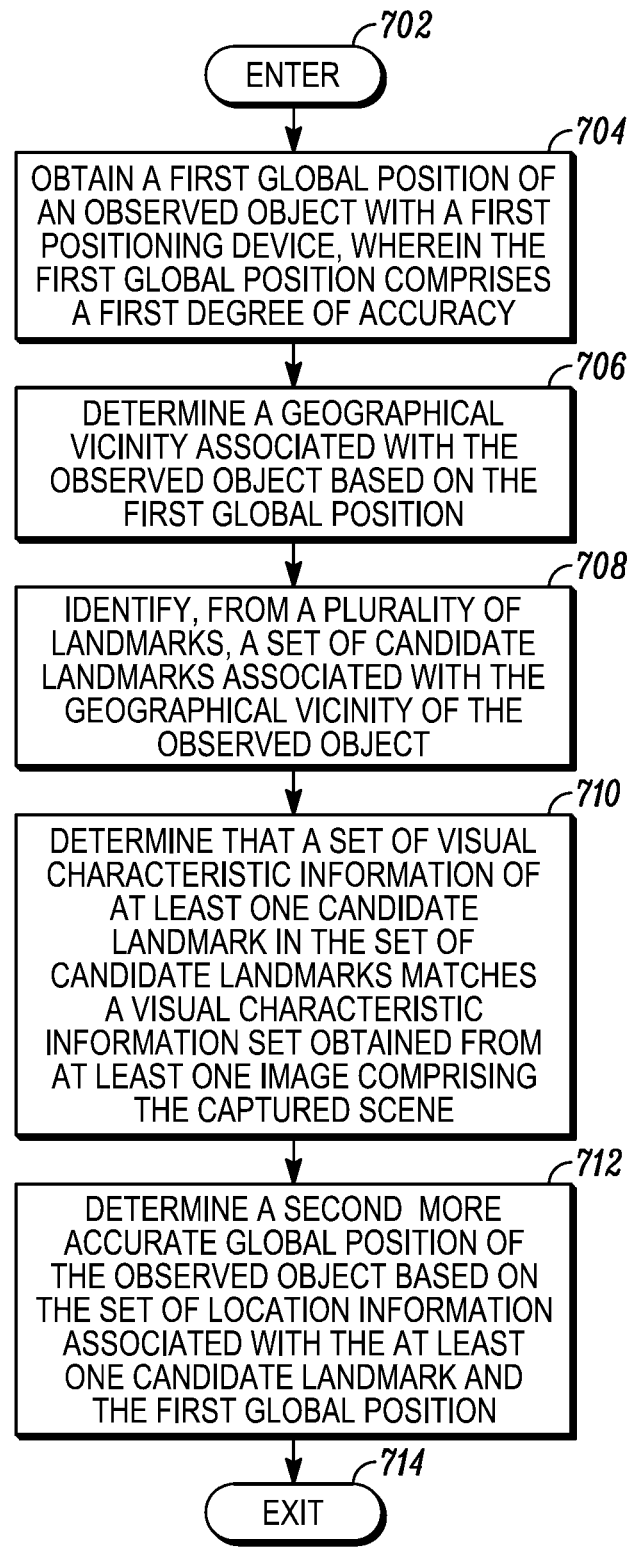
FIG. 7 is an operational flow diagram illustrating another process for determining the location of an object utilizing visual environmental features/objects according to one embodiment of the present invention.

FIG. 7 is an operational flow diagram illustrating another example of the location determining process discussed above. The operational flow begins at step 702 and flows directly to step 704. The LDS 104, at step 704, obtains a first global position of an observed object with a first positioning device 124. The first global position comprises a first degree of accuracy associated with a position of the observed object. The LDS 104, at step 706, determines a geographical vicinity (1108, in FIG. 11) associated with the observed object based on the first global position. In one embodiment, the vicinity is a geographical area centered at the first global position, with a radius large enough to include all possible landmarks that could be seen by the vehicle's cameras with sufficient clarity to discriminate one landmark from another, and to determine if they are damaged above the second threshold or not. One advantage of having a vicinity is to limit the set of landmarks in the database being compared to the observed objects, so that the process of comparison and matching can be done rapidly in real time as the vehicle moves through landmark-containing terrain.

The LDS 104, at step 708, identifies, from a plurality of landmarks, a set of candidate landmarks associated with the geographical vicinity of the observed object based on a set of location information associated with each of the plurality of landmarks. Each of the set of candidate landmarks being expected to be observable in the geographical vicinity. The LDS 104, at step 710, determines that a set of visual characteristic information of at least one candidate landmark in the set of candidate landmarks matches a visual characteristic information set obtained from at least one captured image comprising a scene associated with the observed object. The LDS 104, at step 712, determines a second global position of the observed object based on the set of location information associated with the at least one candidate landmark and the first global position. The second global position comprises a second degree of accuracy that is (or at least expected to be) greater than the first degree of accuracy of the first global position. The control flow then exits at step 714.

Figure 8:
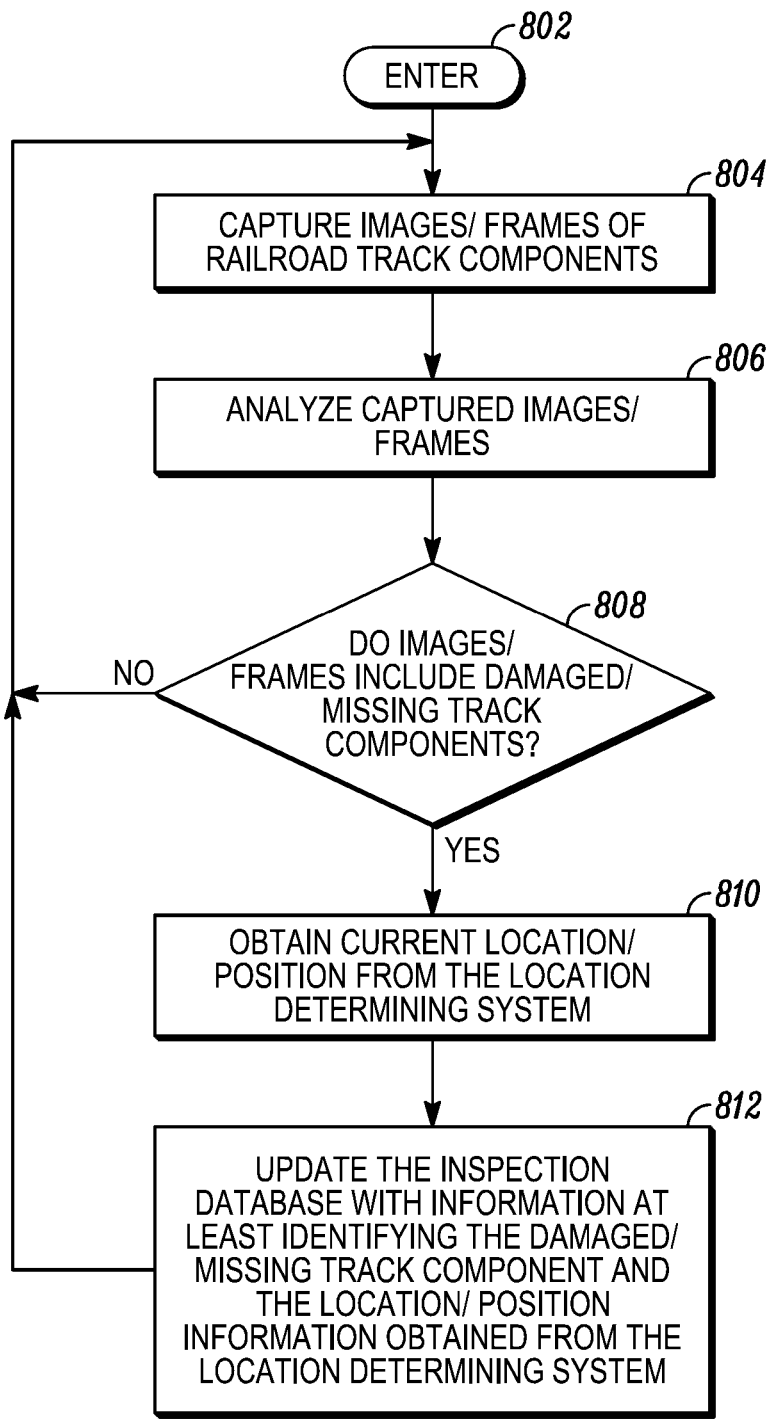
FIG. 8 is an operational flow diagram illustrating one process for determining the location of a damaged or missing railroad track component according to one embodiment of the present invention.

FIG. 8 is an operational flow diagram illustrating one example of association of location information with a railroad track component identified as missing or damaged. The operational flow begins at step 802 and flows directly to step 804. The ODS 106, at step 804, captures images/frames 113, some of which are images of railroad track components. The ODS 106, at step 806, analyzes the captured images/frames of railroad track components. The inspection system 110, at step 808, determines, based on the ODS analysis, if those images/frames include any missing or damaged track components. If the result of this determination is negative, the control flow returns to step 804. If the result of this determination is positive, the inspection system 110, at step 810, obtains the current location/position of the track component from the LDS 104. The inspection system 110, at step 812, updates the inspection database 120 with information that at least identifies the damaged/missing track component and also with the location/position information obtained from the LDS 104. The control flow returns to step 804.

Information Processing System

Figure 9:
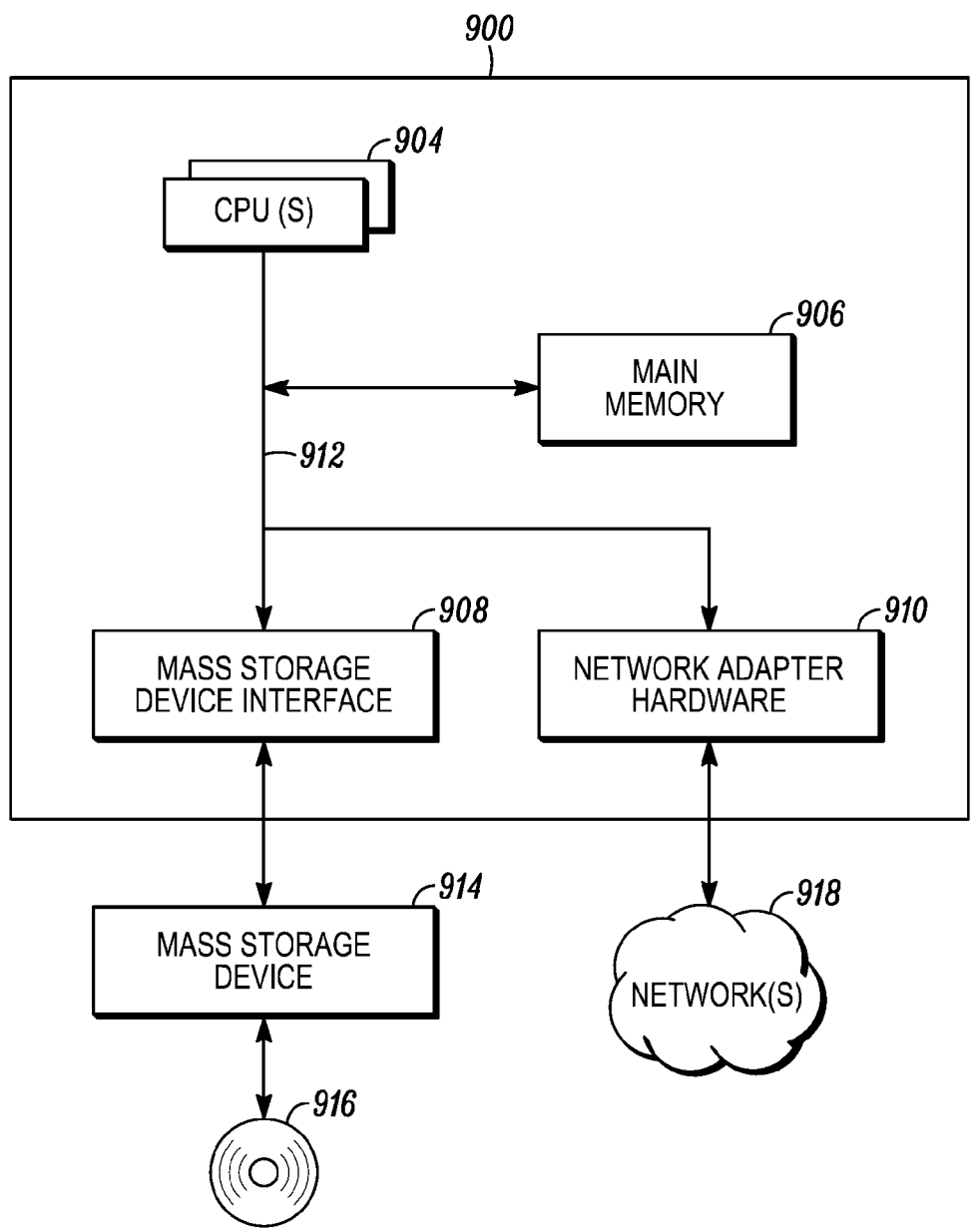
FIG. 9 is a block diagram illustrating a more detailed view of an information processing system according to one embodiment of the present invention.

FIG. 9 is a block diagram illustrating an information processing system that can be utilized in embodiments of the present invention. The information processing system 900 is based upon a suitably configured processing system adapted to implement one or more embodiments of the present invention (e.g., the system 102 of FIG. 1). Any suitably configured processing system can be used as the information processing system 900 in embodiments of the present invention. The information processing system 900 comprises one or more processor(s) 904 that are connected to a main memory 906, mass storage interface 908, and network adapter hardware 910. A system bus 912 interconnects these system components. Although not shown, sensory peripherals such as the imaging system 108, the GPS module 124, the DMI(s) 128, and the IMU(s) are communicatively coupled to the system bus 912.

The main memory 906, in this embodiment, can comprise instructions and data associated with the location determining system 104 and the object detection system 106. Although not shown, the main memory 906 can also include at least portions of the inspection system 110, image data base 112, environmental database 116, inspection database 120, GPS data 126, DMI data 130, IMU data 134, etc. The mass storage interface 908 is used to connect mass storage devices, such as mass storage device 914, to the information processing system 900. One specific type of data storage device is an optical drive such as a CD/DVD drive, which can be used to store data to, and read data from, a computer-readable medium or storage product such as (but not limited to) a CD/DVD 916. Other types of data storage devices are magnetic read/write storage devices, solid state storage devices, and/or the like.

An optional operating system included in the main memory is a suitable multitasking operating system such as any of the Linux, UNIX, Windows, and Windows Server based operating systems. Embodiments of the present invention are also able to use any other suitable operating system. It should be noted that other embodiments of the present invention do not require an operating system. Some embodiments of the present invention utilize architectures such as (but not limited to) object-oriented frameworks that allow instructions of the components of operating system to be executed on any processor located within the information processing system 900. The network adapter hardware 910 is used to provide an interface to a network 918. Embodiments of the present invention are able to be configured to work with any data communications connections including present day analog and/or digital techniques or via a future networking mechanism.

Non-Limiting Examples

Although the exemplary embodiments of the present invention are described in the context of a fully functional computer system, those of ordinary skill in the art will appreciate that various embodiments are capable of being distributed as a program product via CD or DVD, CD-ROM, or other form of recordable media, or via any type of electronic transmission mechanism. Also, aspects of the present invention may take the form of an entirely hardware embodiment, an entirely software embodiment (including firmware, resident software, micro-code, etc.), or an embodiment combining software and hardware aspects that may all generally be referred to herein as a "circuit" "module" or "system".

Any combination of one or more computer readable medium (media) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

The invention claimed is:

1. A method for determining a global position of an observed object, the method comprising:
    obtaining a first global position of an observed object with at least one positioning device;
    determining if a set of stored visual characteristic information of at least one landmark matches a visual characteristic information set obtained from at least one captured image comprising a scene associated with the observed object; and
    determining, based on the set of stored visual characteristic information matching the obtained visual characteristic information set, a second global position of the observed object based on a set of stored location information associated with the at least one landmark and the first global position.

2. The method of claim 1, wherein the first global position comprises a first degree of accuracy and the second global position comprises a second degree of accuracy that is greater than the first degree of accuracy.

3. The method of claim 1, further comprising:
    determining a geographical vicinity associated with the observed object based on the first global position; and
    selecting the at least one landmark from a plurality of landmarks based on a set of location information associated with the at least one landmark corresponding to the geographical vicinity that has been determined.

4. The method of claim 3, wherein the geographical vicinity includes an area within a given distance from the first global position.

5. The method of claim 1, wherein at least the set of location information associated with the landmark comprises one or more of:
    longitude data and latitude data;
    distance travelled from a given reference point; and
    a number of railroad ties counted from a given reference point.

6. The method of claim 1, further comprising:
    determining that the set of stored visual characteristic information of the at least one landmark fails to match the visual characteristic information set obtained from the at least one captured image;
    identifying at least one visual characteristic of the at least one landmark that has changed based on the set of stored visual characteristic information of the at least one landmark and the visual characteristic information set obtained from the at least one captured image; and
    updating, based on the identifying, the set of stored visual characteristic information associated with the at least one landmark to include the at least one visual characteristic that has changed.

7. The method of claim 1, further comprising:
    determining that the set of stored visual characteristic information of the at least one landmark fails to match the visual characteristic information set obtained from the at least one captured image;
    determining, based on the set of stored visual characteristic information failing to match the visual characteristic information set, that the at least one landmark has been removed; and
    updating at least one database to remove the set of stored visual characteristic information and the set of location information associated with the at least one landmark to indicate that at least one landmark has been removed.

8. The method of claim 1, wherein determining if the set of stored visual characteristic information of the at least one landmark matches the visual characteristic information obtained from the at least one captured image comprises:
    comparing the set of stored visual characteristic information associated with the at least one landmark to the visual characteristic information set obtained from the at least one captured image; and
    determining that the set of stored visual characteristic information associated with the at least one landmark matches the visual characteristic information set within a given visual appearance threshold.

9. The method of claim 7, wherein determining that the set of stored visual characteristic information matches the visual characteristic information set within a given visual appearance threshold comprises:
    determining, based on the comparing, that a set of differences between the set of stored visual characteristic information associated with the at least one landmark and the visual characteristic information set obtained from the at least one captured image is within the given visual appearance threshold.

10. The method of claim 1, wherein the second global position is further determined based on at least one of a railroad tie count and a distance travelled from a given reference point.

11. The method of claim 1, wherein the observed object is at least one of a missing railroad track component and a damaged railroad track component.

12. A method for maintaining a database of target objects for inspection, the method comprising:
    analyzing at least one image comprising a scene, wherein the image is captured by at least one image capturing device situated on a vehicle;
    identifying, based on the analyzing, a first set of visual characteristic information associated with the scene;
    comparing the first set of visual characteristic information with a second set of visual characteristic information associated with at least one target object;
    determining, based on the comparing, if the first set of visual characteristic information and the second set of visual characteristic information match each other within a given threshold;
    based on the first set of visual characteristic information and the second set of visual characteristic information matching each other,
        obtaining a set of positioning information associated with the vehicle; and
        updating a database record comprising the second set of visual characteristic information and associated with the at least one target object, the updating adding the set of positioning information to the database record;

based on the first set of visual characteristic information and the second set of visual characteristic information failing to match each other, identifying at least one visual characteristic of the at least one target object that has changed based on the first set of visual characteristic information and the second set of visual characteristic information;

obtaining a set of positioning information associated with the vehicle; and updating, based on the identifying, the database record comprising the second set of visual characteristic information and associated with the at least one target object, the updating adding the set of positioning information and the at least one visual characteristic that has changed to the database record.

13. An information processing system for determining a global position of an observed object, the information processing system comprising:

a memory;

a processor communicatively coupled to the memory; and a location determining system communicatively coupled to the memory and the processor, wherein the location determining system is configured to perform a method comprising:

obtaining a first global position of an observed object with at least one positioning device;

determining if a set of stored visual characteristic information of at least one landmark matches a visual characteristic information set obtained from at least one captured image comprising a scene associated with the observed object; and determining, based on the set of stored visual characteristic information matching the obtained visual characteristic information set, a second global position of the observed object based on a set of stored location information associated with the at least one landmark and the first global position.

14. The information processing system of claim 13, wherein the first global position comprises a first degree of accuracy and the second global position comprises a second degree of accuracy that is greater than the first degree of accuracy.

15. The information processing system of claim 13, the method further comprising:

determining a geographical vicinity associated with the observed object based on the first global position; and selecting the at least one landmark from a plurality of landmarks based on a set of location information associated with the at least one landmark corresponding to the geographical vicinity that has been determined.

16. The information processing system of claim 15, wherein the geographical vicinity includes an area within a given distance from the first global position.

17. The information processing system of claim 13, wherein the method further comprises:

determining that the set of stored visual characteristic information of the at least one landmark fails to match the visual characteristic information set obtained from the at least one captured image;

identifying at least one visual characteristic of the at least one landmark that has changed based on the set of stored visual characteristic information of the at least one landmark and the visual characteristic information set obtained from the at least one captured image; and updating, based on the identifying, the set of stored visual characteristic information associated with the at least one landmark to include the at least one visual characteristic that has changed.

18. The information processing system of claim 13, wherein the method further comprises:

determining that the set of stored visual characteristic information of the at least one landmark fails to match the visual characteristic information set obtained from the at least one captured image;

determining, based on the set of stored visual characteristic information failing to match the visual characteristic information set, that the at least one landmark has been removed; and updating at least one database to remove the set of stored visual characteristic information and the set of location information associated with the at least one landmark to indicate that at least one landmark has been removed.

19. The information processing system of claim 13, wherein determining if the set of stored visual characteristic information of the at least one landmark matches the visual characteristic information obtained from the at least one captured image comprises:

comparing the set of stored visual characteristic information associated with the at least one landmark to the visual characteristic information set obtained from the at least one captured image; and determining that the set of stored visual characteristic information associated with the at least one landmark matches the visual characteristic information set within a given visual appearance threshold.

20. The information processing system of claim 19, wherein determining that the set of stored visual characteristic information matches the visual characteristic information set within a given visual appearance threshold comprises:

determining, based on the comparing, that a set of differences between the set of stored visual characteristic information associated with the at least one landmark and the visual characteristic information set obtained from the at least one captured image is within the given visual appearance threshold.

* * * * *